(12) United States Patent
Min

(10) Patent No.: US 11,613,228 B2
(45) Date of Patent: *Mar. 28, 2023

(54) ROOF AIRBAG FOR VEHICLES

(71) Applicant: HYUNDAI MOBIS CO., LTD., Seoul (KR)

(72) Inventor: Byung Ho Min, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/502,110

(22) Filed: Oct. 15, 2021

(65) Prior Publication Data

US 2022/0153223 A1 May 19, 2022

(30) Foreign Application Priority Data

Nov. 19, 2020 (KR) .................. 10-2020-0155813

(51) Int. Cl.
| | |
|---|---|
| *B60R 21/214* | (2011.01) |
| *B60R 21/233* | (2006.01) |
| *B60R 21/231* | (2011.01) |
| *B60R 21/2346* | (2011.01) |
| *B60R 21/26* | (2011.01) |
| *B60R 21/00* | (2006.01) |

(52) U.S. Cl.
CPC ............ *B60R 21/26* (2013.01); *B60R 21/214* (2013.01); *B60R 21/231* (2013.01); *B60R 21/233* (2013.01); *B60R 21/2346* (2013.01); *B60R 2021/0018* (2013.01); *B60R 2021/23192* (2013.01); *B60R 2021/23308* (2013.01); *B60R 2021/23316* (2013.01)

(58) Field of Classification Search
CPC . B60R 21/214; B60R 21/233; B60R 21/2334; B60R 21/231; B60R 21/237; B60R 21/213; B60R 21/2346; B60R 2021/23192; B60R 2021/23308; B60R 2021/23107; B60R 2021/0048; B60R 2021/161; B60R 2021/0018; B60R 2021/23316; B60R 2021/2612; B60R 2021/01231; B60R 2021/23538
USPC ................................... 280/730.1, 729, 743.1
See application file for complete search history.

(56) References Cited

U.S. PATENT DOCUMENTS

| | | | | |
|---|---|---|---|---|
| 10,449,923 | B2 * | 10/2019 | Son ................ | B60R 21/233 |
| 2018/0162315 | A1 * | 6/2018 | Lee ................ | B60R 21/2346 |
| 2018/0265029 | A1 * | 9/2018 | Min ................ | B60R 21/23 |
| 2018/0312130 | A1 * | 11/2018 | Min ................ | B60R 21/13 |

(Continued)

FOREIGN PATENT DOCUMENTS

| | | |
|---|---|---|
| KR | 20170008098 A | 1/2017 |
| KR | 20180120284 A | 11/2018 |

OTHER PUBLICATIONS

Definition of "around" by the Free Dictionary; https://www.thefreedictionary.com/around; Aug. 17, 2022.*

*Primary Examiner* — Keith J Frisby
(74) *Attorney, Agent, or Firm* — NovoTechIP International PLLC

(57) ABSTRACT

A roof airbag for vehicles is proposed. The roof airbag includes: a main chamber configured to be deployed as gas is introduced therein through a diffuser; and an overlap chamber into which the gas may be introduced and configured to be deployed into a shape that overlaps the main chamber around the diffuser.

8 Claims, 6 Drawing Sheets

(56) References Cited

U.S. PATENT DOCUMENTS

2021/0138996 A1* 5/2021 Min .................... B60R 21/2646
2022/0063543 A1* 3/2022 Lee ...................... B60R 21/231
2022/0153222 A1* 5/2022 Min ...................... B60R 21/214

* cited by examiner

ROOF AIRBAG FOR VEHICLES

CROSS-REFERENCE TO RELATED APPLICATIONS

The present application claims priority to Korean Patent Application No. 10-2020-0155813, filed Nov. 19, 2020, the entire contents of which is incorporated herein for all purposes by this reference.

BACKGROUND OF THE INVENTION

1. Field of the Invention

The present invention relates to a roof airbag for vehicles, wherein occupant protection performance is improved through structural improvement of the roof airbag.

2. Discussion of Related Art

An airbag is provided in the interior of a vehicle to protect occupants from an impact generated during a vehicle collision.

An airbag cushion is normally stored in a folded state in an airbag housing. When a sensor detects a vehicle collision, gas is rapidly supplied into the airbag cushion by an inflator, and the airbag cushion is deployed instantaneously. Therefore, the occupant can be protected from an impact of the vehicle collision.

When a vehicle rollover accident occurs in a vehicle equipped with a sunroof, a roof glass of the sunroof is broken and causes the occupant to be ejected out of the vehicle through an opening of a vehicle roof. Therefore, a roof airbag is provided in a roof portion so as to prevent the occupant from being ejected out of the vehicle, so that occupant injuries are reduced.

As described above, although the roof airbag is an airbag that prevents the occupants from being ejected out of the vehicle, when the head portion of an occupant hits the airbag cushion during deployment of the airbag cushion, a portion of the airbag cushion may be ejected out of the vehicle together with the head portion of the occupant due to the weight of the occupant, and a problem in which safety of the occupant cannot be secured may be caused.

The foregoing is intended merely to aid in the understanding of the background of the present invention, and is not intended to mean that the present invention falls within the purview of the related art that is already known to those skilled in the art.

BRIEF SUMMARY OF THE INVENTION

Accordingly, the present invention has been made keeping in mind the above problems occurring in the related art, and the present invention is intended to provide a roof airbag for vehicles, wherein the roof airbag has enhanced occupant protection performance through structural improvement of the roof airbag to prevent the head of an occupant from being ejected out of a vehicle.

In order to achieve the above objective, according to one aspect of the present invention, there is provided a roof airbag for vehicles, the roof airbag including: a main chamber configured to be deployed as gas is introduced therein through a diffuser; and an overlap chamber into which the gas may be introduced and configured to be deployed into a shape that overlaps the main chamber around the diffuser.

The gas introduced into the main chamber may be introduced into the overlap chamber so that the overlap chamber may be deployed.

The diffuser may be connected to a center portion of an end of the main chamber; and the overlap chamber may be connected to opposite side portions of the end of the main chamber.

On the basis of a connection line at which the main chamber and the overlap chamber are connected to each other, the overlap chamber and the main chamber may be sewn while overlapping each other; and the overlap chamber and the main chamber may be configured to be deployed while maintaining the sewn overlap state.

The diffuser may be formed in a shape in which an edge thereof may be cut and divided within the overlap chamber.

The overlap chamber may include: first deployment areas connected to the main chamber extended toward left and right sides of the diffuser and configured to be deployed in a longitudinal direction of the roof airbag; and a second deployment area connected between the opposite first deployment areas and configured to be deployed in a transversal direction of the roof airbag.

The gas may be injected into a first deployment area of the main chamber connected to the diffuser so that the first deployment area of the main chamber may be deployed; and the gas introduced through left and right sides of the first deployment area of the main chamber may be introduced into the first deployment areas of the overlap chamber, so that the overlap chamber may be deployed.

The main chamber may have a transversal width equal to a transversal width of the overlap chamber.

A longitudinal deployment length of the overlap chamber may be shorter than or equal to a longitudinal deployment length of the main chamber.

According to the present invention as described above, when the airbag cushion is deployed, the main chamber is deployed in a shape that covers an opening of a sunroof and the overlap chamber is deployed at a portion where the head of an occupant hits so as to realize the dual cushion structure. Accordingly, a risk of ejecting the occupant out of the vehicle can be prevented.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

Figure 1:
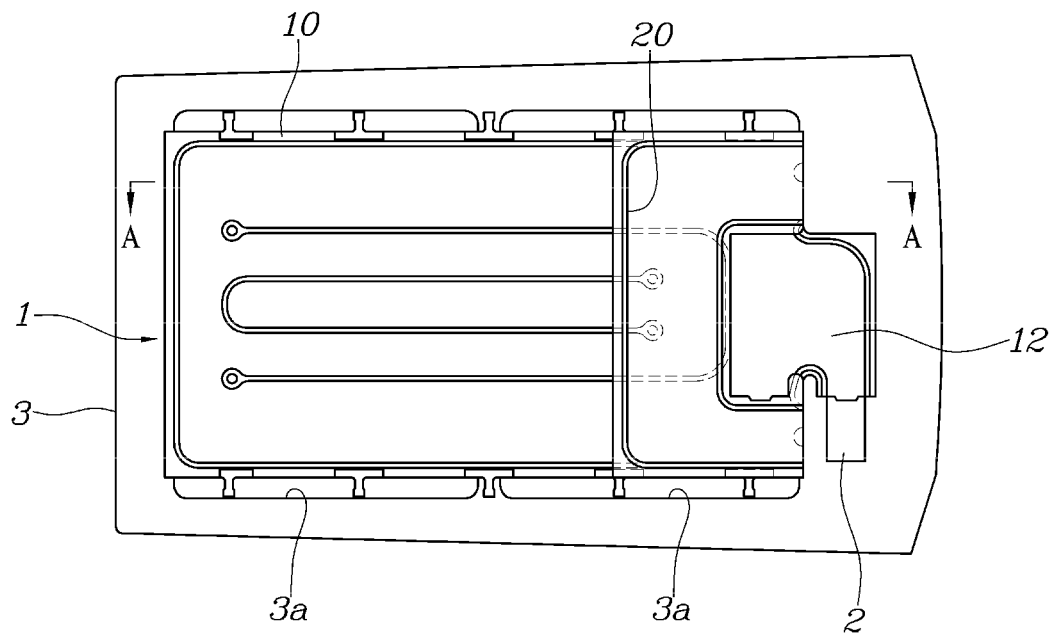
FIG. 1 is a view showing a deployed roof airbag according to a first embodiment of the present invention.

Hereinbelow, preferred embodiments of the present invention will be described in detail with reference to accompanying drawings.

In the following description, the structural or functional description specified to exemplary embodiments according to the concept of the present invention is intended to describe the exemplary embodiments, so it should be understood that the present invention may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present invention are not limited to the embodiments which will be described hereinbelow with reference to the accompanying drawings, but all of modifications, equivalents, and substitutions are included in the scope and spirit of the invention.

It will be understood that, although the terms first and/or second, etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent", or "directly adjacent" should be construed in the same manner.

The terminology used herein is for the purpose of describing particular embodiments only and is not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

Prior to the description of technical configuration of the present invention, a roof airbag device will be described briefly, the roof airbag device may be provided at a vehicle roof equipped with a general sunroof with a relatively small window in addition to a panorama sunroof with a relatively large window, and may be deployed to cover a roof glass.

The roof airbag has an airbag cushion 1 assembled to a module bracket, and the airbag cushion 1 is connected to an inflator 2 generating gas according to ignition operation of an igniter.

The roof frame 3 has an opening 3a. Guide wires are provided at left and right portions of the opening 3a in a longitudinal direction of the opening 3a.

On the basis of a deployed state of the airbag cushion 1, guide rings are fastened to the opposite portions of the airbag cushion 1 at predetermined intervals in a longitudinal direction of the airbag cushion. The guide rings are inserted over the guide wire and move along the guide wire in the longitudinal direction of the opening 3a.

When gas is generated by igniting the inflator 2, the gas is supplied into the airbag cushion 1 to start deployment of the airbag cushion 1. In the deployment process, the guide rings coupled to the airbag cushion 1 move in a deployment direction of the airbag cushion 1 along the guide wires, so that the airbag cushion 1 is deployed in a longitudinal direction of the roof airbag at a lower end of the roof glass. Therefore, the airbag cushion 1 covers the roof glass to prevent an occupant from being ejected out of the roof glass.

Figure 5:
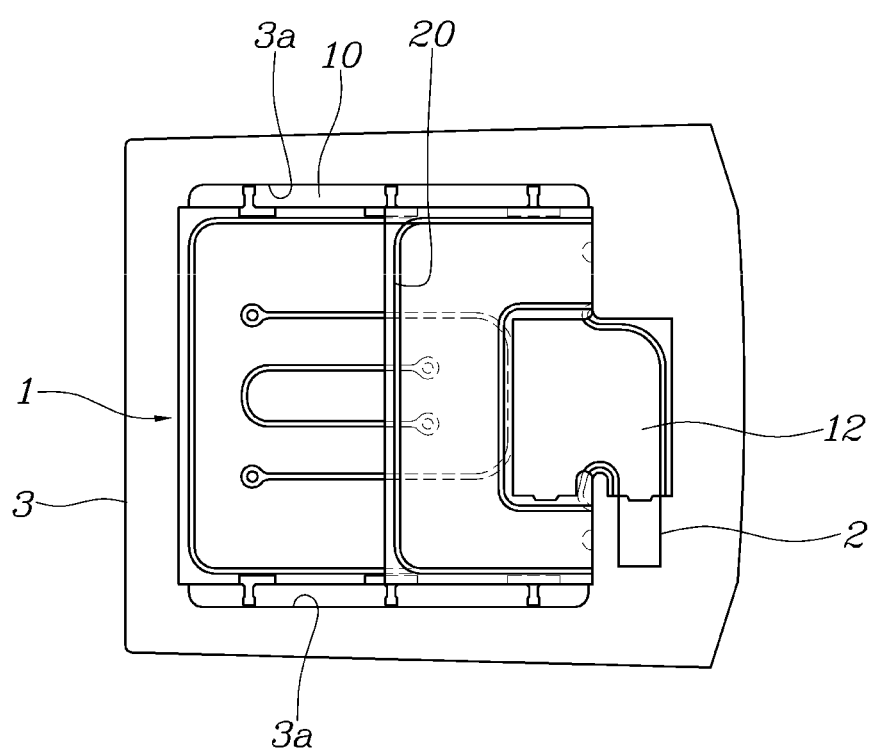
FIG. 5 is a view showing the deployed roof airbag according to a second embodiment of the present invention.

FIG. 1 is a view showing a deployed roof airbag according to a first embodiment of the present invention. FIG. 5 is a view showing the deployed roof airbag according to a second embodiment of the present invention. The present invention may be applied to a panorama sunroof shown in FIG. 1 and a general sunroof of which a window size is formed smaller than the panorama sunroof.

In describing the roof airbag according to the present invention with reference to accompanying drawings, the roof airbag includes: a main chamber 10 deployed as gas is injected thereinto through a diffuser 12; and an overlap chamber 20 into which the gas is injected, and deployed in a shape that overlaps the main chamber 10 around the diffuser 12.

The airbag cushion 1 of the roof airbag mainly includes the main chamber 10 and the overlap chamber 20. When a vehicle overturn accident occurs, a portion of the main chamber 10 connected to the diffuser 12 is an area where the heads of a driver and a passenger on a first row are likely to come into contact. Therefore, a dual cushion structure of overlapping the main chamber 10 and the overlap chamber 20 to each other is applied to such portion.

When the airbag cushion 1 is deployed, the main chamber 10 of the airbag cushion 1 is deployed in a shape that covers the opening of the roof, and the overlap chamber 20 of the airbag cushion 1 is deployed while overlapping the main chamber 10.

Therefore, thickness of the airbag cushion 1 increases, so that the occupant can be prevented from being ejected through the opening 3a of the sunroof of the vehicle during a rollover accident of the vehicle.

Figure 2:
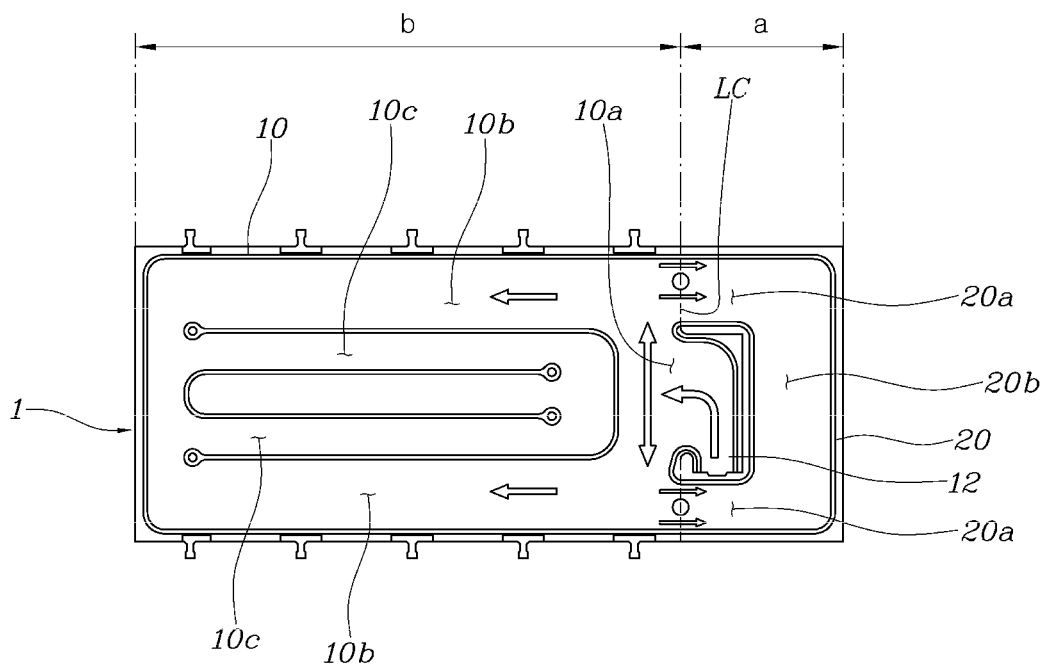
FIG. 2 is a view showing a shape before a main chamber and an overlap chamber overlap each other and showing a gas flow in FIG. 1.
Figure 6:
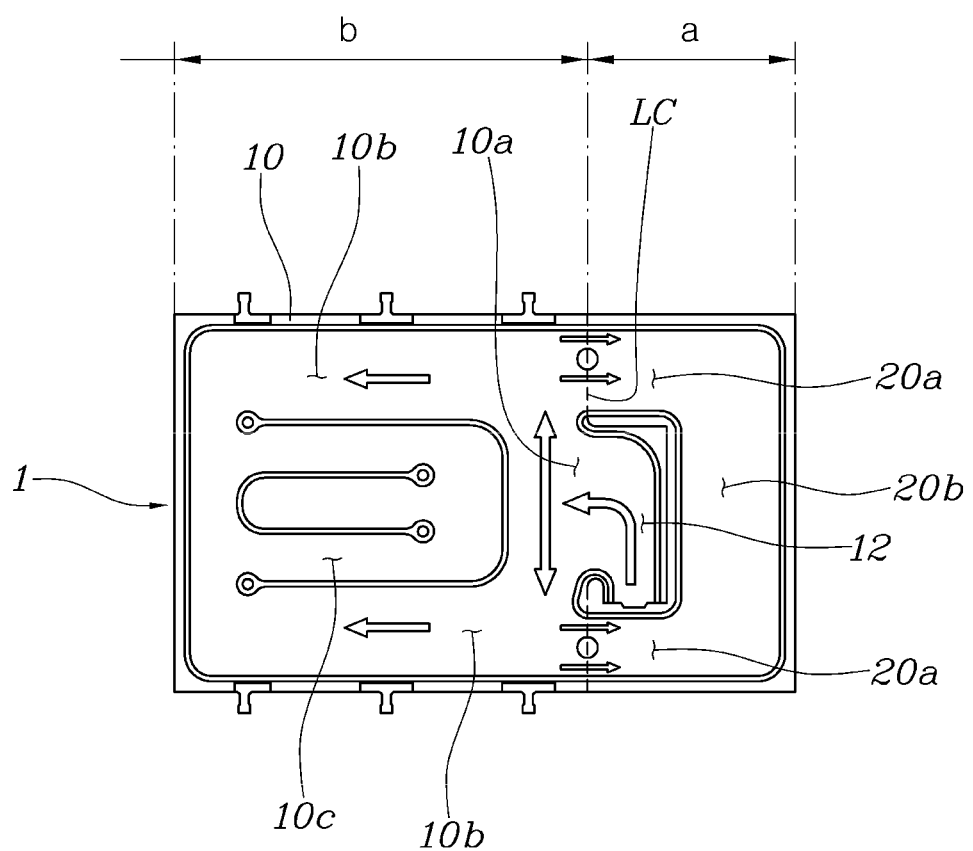
FIG. 6 is a view showing a shape before the main chamber and the overlap chamber overlap each other and showing a gas flow in FIG. 5.

In addition, FIG. 2 is a view showing a shape before the main chamber 10 and the overlap chamber 20 overlap each other and showing a gas flow in FIG. 1. FIG. 6 is a view showing a shape before the main chamber 10 and the overlap chamber 20 overlap each other and showing a gas flow in FIG. 5.

Referring to the drawings, the inflator 2 is connected to the diffuser 12 so that the gas ignited by the inflator 2 is introduced into the diffuser 12.

The gas introduced into the main chamber 10 is introduced into the overlap chamber 20 so that the overlap chamber 20 may be deployed.

For the above operation, the present invention is configured such that the diffuser 12 is connected to a center portion of an end of the main chamber 10; and the overlap chamber 20 is connected to opposite side portions of the end of the main chamber 10.

The inflator 2 is inserted into the diffuser 12, and the gas discharged from the inflator 2 is introduced into the diffuser 12 and the gas introduced into the diffuser 12 is introduced into the main chamber 10, so that the main chamber 10 is deployed in opposite longitudinal directions thereof.

At the opposite portions of the front end of the main chamber 10, the front end being connected to the diffuser 12, the overlap chamber 20 is connected to the main chamber 10 with passages therebetween. Therefore, the gas flowing in the opposite longitudinal directions of the main chamber 10 is introduced into the overlap chamber 20 to deploy the overlap chamber 20.

As described above, when the airbag cushion 1 is deployed, the overlap chamber 20 is deployed together with the deployment process of the main chamber 10. Therefore, a time difference of deployment between the main chamber 10 and the overlap chamber 20 is minimized, and thus the overlap chamber 20 is also rapidly deployed in addition to the main chamber 10 so as to safely protect the occupant.

On the basis of a connection line LC at which the main chamber 10 and the overlap chamber 20 are connected to each other, the overlap chamber 20 and the main chamber 10 are sewn while overlapping each other, and the overlap chamber 20 and the main chamber 10 may be deployed while maintaining the sewn overlap state.

For example, as the imaginary connection line LC is disposed on a portion connecting the main chamber 10 to the overlap chamber 20, the main chamber 10 and the overlap chamber 20 may be divided from each other on the basis of the connection line LC.

The overlap chamber 20 is folded to the main chamber 10 on the basis of the connection line LC, and then opposite side edges thereof overlapping each other are sewn to fix the overlap chamber 20 to the main chamber 10. Therefore, the airbag cushion 1 may be deployed in a shape in which the overlap chamber 20 overlaps the main chamber 10 during deployment thereof.

As shown in FIGS. 2 and 5, the present invention is configured such that the diffuser 12 is connected to the main chamber 10. Specifically, the diffuser 12 may be formed into a shape in which an edge thereof is cut and divided within the overlap chamber 20.

In other words, the airbag cushion 1 may have a structure in which the main chamber is integrally formed with the overlap chamber 20, and at a portion where the main chamber 10 and the overlap chamber 20 are divided from each other, the diffuser 12 is formed such that the edge thereof is cut in a 'U'-shape. Therefore, the cut portion is provided as the diffuser 12 and a remaining portion excluding the cut portion is provided as the overlap chamber 20, so that the diffuser 12 may be separated from the overlap chamber 20 and thus folding the overlap chamber 20 to a lower end of the main chamber 10 in an overlapping shape.

In addition, the overlap chamber 20 includes: first deployment areas 20a connected to the end of the main chamber 10 extended toward left and right sides of the diffuser 12 and deployed in a longitudinal direction of the roof airbag; and a second deployment area 20b connected between the opposite first deployment areas 20a to be deployed in a width direction of the roof airbag.

The gas is introduced into a first deployment area 10a of the main chamber 10 connected to the diffuser 12, so that the first deployment area 10a is deployed; and the gas introduced through left and right sides of the first deployment area 10a of the main chamber 10 is introduced into the first deployment areas 20a of the overlap chamber 20, so that the overlap chamber 20 may be deployed.

Specifically, the first deployment area 10a of the main chamber 10 is connected to a discharge portion of the diffuser 12, and first ends of the first deployment areas 20a of the overlap chamber 20 are respectively extended from the left and right side portions of the first deployment area 10a, so that the gas discharged from the diffuser 12 allows the first deployment area 10a of the main chamber 10 to be deployed in the width direction of the main chamber 10, and the gas is introduced into the first deployment areas 20a of the overlap chamber 20 to deploy the first deployment areas 20a.

The second deployment area 20b is extended between second ends of the opposite first deployment areas 20a, and the gas injected into the first deployment areas 20a is introduced into the second deployment area 20b to deploy the second deployment area 20b, whereby the overlap chamber 20 may be deployed.

During deployment of the airbag cushion 1, the main chamber 10 and the overlap chamber 20 are deployed together without a significant time difference therebetween. Therefore, a cushion thickness with respect to an occupant hitting portion increases and the airbag cushion 1 is rapidly deployed, thereby safely protecting the occupant.

For example, the gas injected into the first deployment area 10a of the main chamber 10 is divided and introduced into a deployment area extended in the longitudinal direction toward the rear end of the main chamber 10 as well as into the first deployment areas 20a of the overlap chamber 20. A plurality of deployment areas is continually connected to each other in the longitudinal or width direction in the main chamber 10, so that the main chamber 10 may be deployed.

In the accompanying drawings, after the gas is introduced in a direction from the front end to the rear end of the main chamber along second deployment areas 10b provided at opposite edges of the main chamber 10 and the opposite side edges of the main chamber 10 are filled with the gas, the gas is introduced in the direction from the front end to the rear end of the main chamber along central third deployment areas 10c provided between the second deployment areas 10b, so that the central portion of the main chamber 10 is filled with the gas whereby the main chamber 10 is deployed.

Referring to FIGS. 2 and 5, the main chamber 10 has a width equal to a width of the overlap chamber 20.

For example, the main chamber 10 and the overlap chamber 20 are deployed into quadrangle shapes formed in a longitudinal direction of the vehicle. As the main chamber and the overlap chamber have the widths formed equal to each other, the cushion thickness of the occupant hitting portion entirely increases in the width direction and thus safely protects the occupant.

Figure 3:
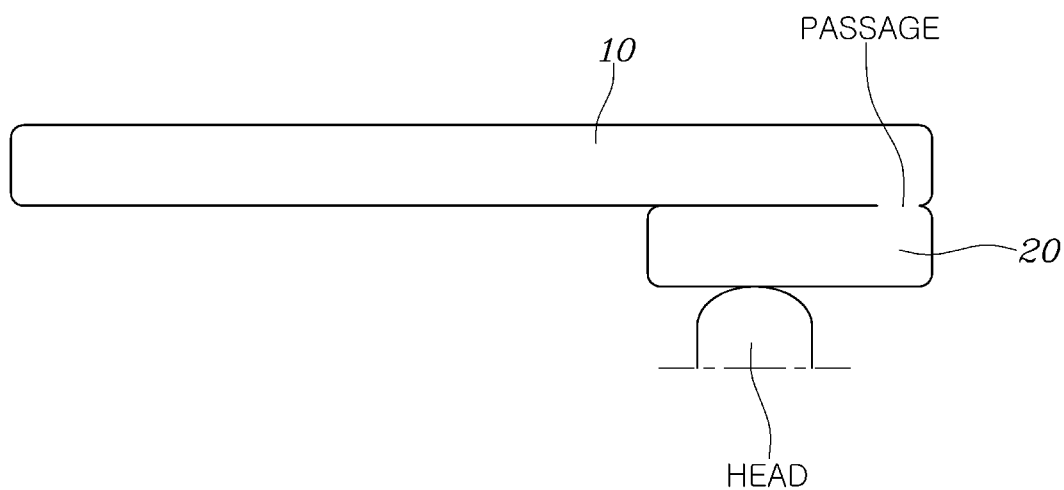
FIG. 3 is a sectional view taken along line A-A in FIG. 1.
Figure 4:
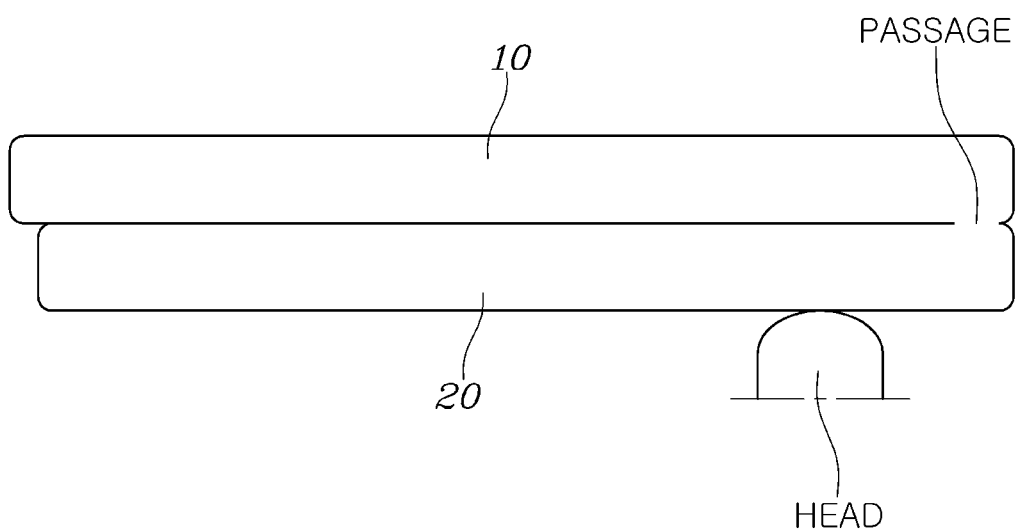
FIG. 4 is a view showing a long-formed structure of the overlap chamber of FIG. 3.

FIG. 3 is a sectional view taken along line A-A in FIG. 1. FIG. 4 is a view showing a structure of the overlap chamber 20 of FIG. 3, which is formed long.

Referring to the drawings, a longitudinal deployment length of the overlap chamber 20 may be shorter than or equal to a longitudinal deployment length of the main chamber 10.

In other words, when the longitudinal deployment length of the overlap chamber 20 is (a) and longitudinal deployment length of the main chamber 10 is (b) in the drawings, (b) is equal to or greater than a (b≥a).

Accordingly, as the length of the overlap chamber 20 is adjusted to a required area for the dual cushion structure, the overlap chamber 20 is configured to overlap the main chamber 10, so a degree of design freedom in the dual cushion structure may be improved and the dual cushion structure may be easily realized.

Hereinbelow, deployment operation of the roof airbag for vehicles according to the present invention will be described.

When the roof airbag is deployed by a rollover accident of the vehicle, the gas is generated by the inflator 2 and then is introduced into the diffuser 12. The gas introduced into the diffuser 12 is introduced into the main chamber 10, so that the first deployment area 10a of the main chamber 10 starts to be deployed in the width direction of the main chamber 10, which may be perpendicular to the longitudinal direction of the main chamber.

Then, as the overlap chamber 20 is connected to the left and right portions of the first deployment area 10a of the main chamber 10, the gas injected into the first deployment area 10a of the main chamber 10 is divided into the second deployment areas 10b of the main chamber 10 and the first deployment areas 20a of the overlap chamber 20, and the main chamber 10 and the overlap chamber 20 are deployed together.

As described above, as the overlap chamber 20 is deployed together with the main chamber 10 to achieve the dual cushion structure in which the overlap chamber 20 overlaps the lower end of the main chamber 10 in the deployment process of the main chamber 10, the cushion thickness at the portion where the head of the occupant hits rapidly increases and thus prevents the head of the occupant from being ejected out of the vehicle through the sunroof during a rollover accident.

As described above, according to the present invention, when the airbag cushion 1 is deployed, the main chamber 10 is deployed into a shape covering the opening 3a of the sunroof, and the overlap chamber 20 is deployed to realize the dual cushion structure at the portion where the head of the occupant hits, so that the risk of occupant being ejected out of the vehicle may be prevented.

Although the preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A roof airbag for a vehicle, comprising:
    a main chamber configured to deploy when gas is introduced thereto from a diffuser and having a plurality of sides including a first side connected to the diffuser; and
    an overlap chamber configured to deploy and overlap the main chamber around the diffuser when the gas is introduced to the overlap chamber,
    wherein the first side of the main chamber has (1) a center portion connected to the diffusor and (2) side portions connected to the overlap chamber, and
    wherein the gas supplied from the diffusor is introduced to the main chamber in a first direction and then introduced to the overlap chamber in a second direction opposite to the first direction.

2. The roof airbag of claim 1, wherein the overlap chamber is connected to the main chamber such that the gas is introduced to the overlap chamber via the main chamber.

3. The roof airbag of claim 1, wherein:
    the overlap chamber and the main chamber are sewn together along a connection line between the main chamber and the overlap chamber; and
    the sewing along the connection line maintains the main chamber and the overlap chamber overlapping each other when the main chamber and the overlap chamber are deployed.

4. The roof airbag of claim 1, wherein the diffuser has an edge that is cut and divided within the overlap chamber.

5. The roof airbag of claim 1, wherein the overlap chamber includes:
    a pair of first deployment areas connected to the main chamber at left and right sides of the diffuser, respectively, and extending in a longitudinal direction of the roof airbag; and
    a second deployment area extending between the pair of first deployment areas in a width direction of the roof airbag.

6. The roof airbag of claim 5, wherein the main chamber includes a third deployment area connected to the diffuser and configured to direct the gas injected thereto to the pair of first deployment areas of the overlap chamber through left and right sides of the third deployment area.

7. The roof airbag of claim 1, wherein the main chamber and the overlap chamber have the same width.

8. The roof airbag of claim 1, wherein a longitudinal deployment length of the overlap chamber is less than or equal to that of the main chamber.

* * * * *